Oct. 21, 1969  MYUNG HWAN KIM  3,473,734
FLUID MIXING VALVE

Filed May 31, 1968  2 Sheets-Sheet 1

INVENTOR.
MYUNG-HWAN KIM
By
Miketta, Glenny, Poms & Smith
ATTORNEYS.

Oct. 21, 1969　　　MYUNG HWAN KIM　　　3,473,734
FLUID MIXING VALVE
Filed May 31, 1968　　　　　　　　　　　　　2 Sheets-Sheet 2

INVENTOR.
MYUNG-HWAN KIM
By
Miketta, Glenny, Poms & Smith
ATTORNEYS.

United States Patent Office 3,473,734
Patented Oct. 21, 1969

3,473,734
FLUID MIXING VALVE
Myung Hwan Kim, 13626 Henny Ave.,
Sylmar, Calif. 91342
Filed May 31, 1968, Ser. No. 733,484
Int. Cl. G05d 23/13
U.S. Cl. 236—13                                    11 Claims

ABSTRACT OF THE DISCLOSURE

A fluid mixing valve for blending two fluids having, for example, different temperatures, so as to selectably control the volume and temperature of the confluent flow discharged from the device. The device may be used in conjunction with thermostat and volumetric rate of flow sensing devices for controlling motors which actuate drum-type valve members within the mixing device so as to move the valve members together thereby controlling the proportion of fluid entering the device through inlet conduits and moving the valve members relative to one another so as to control the volumetric rate of fluid flow through an outlet conduit of the device.

---

While the present invention was conceived in connection with a building air distribution system, it will be readily apparent to those skilled in the art that the mixing device or valve herein disclosed may be useful in a variety of applications with both liquids and gases. In the heating and ventilating industry, the use of mixing or blending chambers or devices is, of course, well known. Such devices are used to provide an air flow into a space, such as a room, at a desired volumetric rate of flow and a desired temperature. Such mixing chambers generally have two inlet conduits, one of which is connected to the hot air duct system in the building and the other of which is connected to a cool or cold air duct system. An outlet conduit is provided for discharging the mixed or confluent air flow into the air space.

Temperature control of the air flow discharged into the air space is provided through a thermostat device located in the air space for maintaining such air space at a desired temperature. The volumetric rate of air flow into the air space is controlled through a pressure sensing device (from which the volumetric rate of flow is easily derived) disposed in the outlet conduit of the mixing device. The temperature and volumetric rate of air flow sensing devices are connected to valve actuating motors for moving individual valve members disposed in the several conduits so as to restrict or enlarge the flow area of such conduit.

The difficulty with the prior art mixing devices is that they are characterized by their considerable mechanical complexity and in some devices three individual valve members must be employed to control two inlet conduits and a single outlet conduit. Various shapes and configurations of valve members have been employed including flat damper blades, pneumatically inflatable spheres, or drum-type valve members. In prior art mixing devices using the latter type of valve members, such members have generally been independently mounted on individual shafts and separately controllable so as to open and close a conduit in which it is disposed. Since at least three of such valve members are required in order to control two inlet conduits for air of different temperatures and a single outlet conduit, three separate actuating devices are required. Since actuating devices are one of the more expensive components of a mixing device, the prior art devices have been of not insubstantial cost.

It is therefore an object of this invention to provide a fluid mixing valve or control device for installation in a fluid distribution system adapted to control the flow of fluids at different temperatures from different sources and at different pressures and to selectively mix the fluids to a desired temperature and discharge a confluent fluid flow of desired volumetric rate.

It is another object of this invention to provide an air mixing and volume control device for installation in an air distribution system, the device receiving air at different temperatures from different sources through at least two inlet openings or conduits and selectively controlling the proportion of air entering the device through the inlet conduits in response to a thermostat device and controlling the volume of air through the outlet conduit in response to a volumetric rate of air flow (pressure) sensing device.

It is yet another object of the present invention to provide an air blending and volume regulating devise employing drum-type valve members which are selectively moved together or relative to one another so as to control the air entering into said device through each of several inlet conduits and the air discharge from the device through at least one outlet conduit.

It is a still further object of this invention to provide an air blending and volume regulating device of the above-described type in which the drum-type valve members are coaxially and independently mounted and are operably engaged by means responsive to temperature and volumetric rate of air flow within the conduit of the air distribution system with which the air blending and volume regulating device is employed.

Generally stated, the invention comprises a fluid blending and volume regulating device including a chambered housing having at least two inlet conduits and at least one outlet conduit, and in which is mounted a pair of drum-type valve members coaxially and pivotally mounted on shaft means, one of such valve members being receivable within the other and including an actuating assembly responsive to temperature and volumetric rate of fluid flow so as to selectively pivot the valve members together or relative to one another so as to control the proportion of fluid entering the device through the inlet conduits and also controlling the volume of air discharged through the outlet conduit.

A more detailed explanation of the air blending and volume regulating device, according to the invention, will be described in the following detailed explanation of an exemplary embodiment of the invention. Further objects and advantages will also become apparent to one skilled in the art by consideration of the exemplary embodiment disclosed. Reference will be made to the appended sheet of drawings in which:

Figure 1:
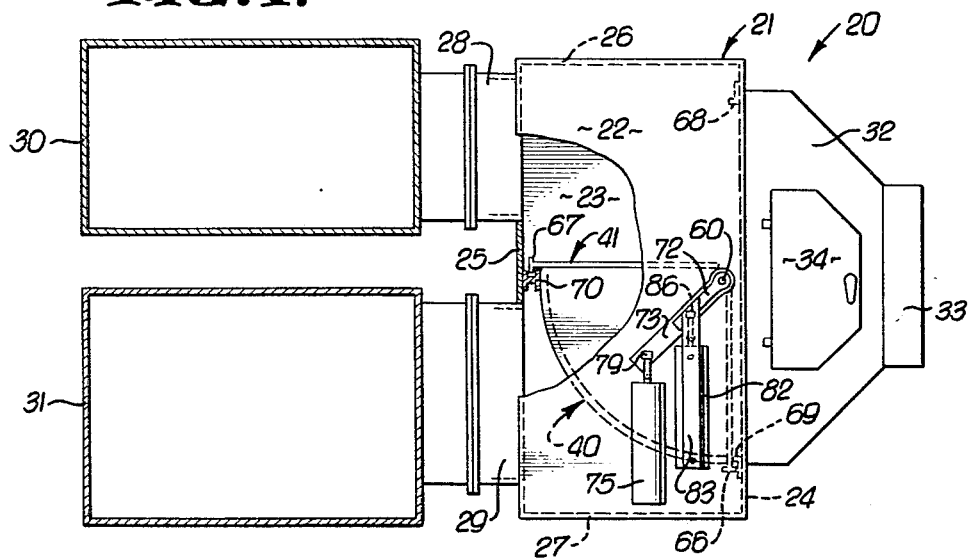
FIG. 1 is a top plan view of an exemplary embodiment of a fluid mixing valve constructed in accordance with the present invention.

Referring now to FIG. 1, there is shown an exemplary embodiment of a fluid mixing valve indicated generally by the reference numeral 20. The exemplary fluid mixing valve 20 is adapted for use as an air mixing and volume controlling device for use in a building air distribution system of low or high velocity for providing heating and ventilating of the building.

The air mixing valve or device 20 includes a chambered housing indicated generally at 21 including a top wall 22, a bottom wall 23, a front wall 24, a rear wall 25, and side walls 26, 27. The rear wall 25 of the housing 21 includes inlet conduits indicated at 28 and 29 connected in a well known manner to ducts 30 and 31, respectively. The ducts 30 and 31 constitute a portion of a building air distribution system and for purposes of explanation it may be assumed that duct 30 conducts hot air while duct 31 conducts cool or cold air.

The frontwall 24 of housing 21 provides an outlet conduit 32 which may have a neck portion 33 and an access door 34.

Figure 3:
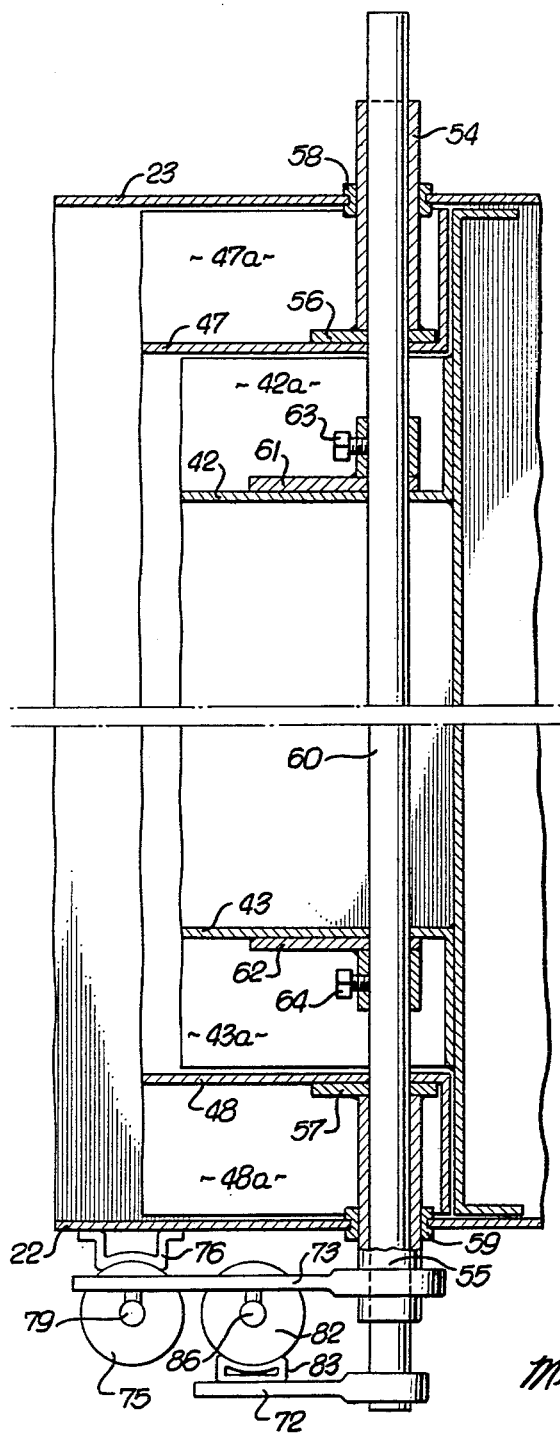
FIG. 3 is a side sectional view of a portion of the device of FIG. 1.
Figure 2:
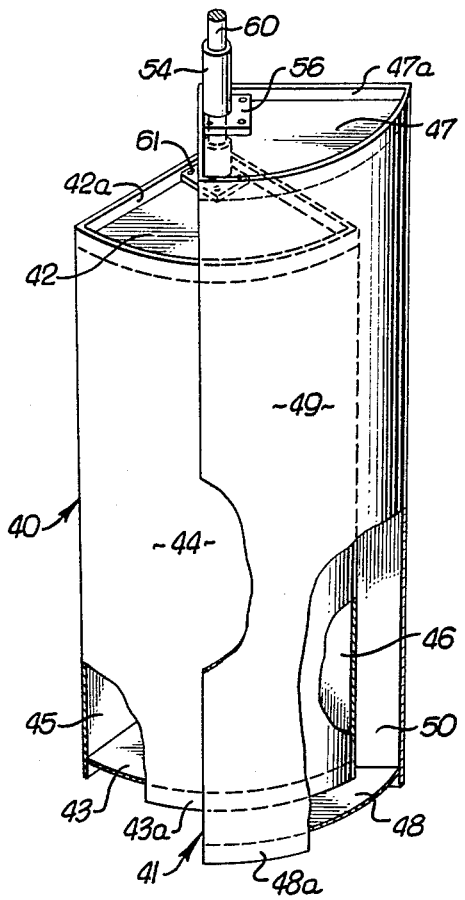
FIG. 2 is a perspective view of the valve members for the device of FIG. 1.

Mounted within housing 21 of the mixing valve 20 are a pair of hollow drum-type valve members indicated generally at 40, 41 and seen best in FIGS. 2 and 3. Valve member 40 constitutes an inner valve member dimensionally smaller in all respects than outer valve member 41.

Valve member 40 includes a pair of arcuate sector end walls 42, 43, a curved or arcuate front wall 44, and radially extending side walls 45, 46. Valve 41 also includes end walls 47, 48, a front curved or arcuate wall 49, and a single side wall 50. The walls of the valve members are constructed of ordinary sheet metal.

The side and front walls of each of the valve members 40, 41 extend longitudinally past the arcuate end walls so as to form lips 47a, 48a on valve 41 and 42a, 43a on valve 40.

The air mixing or blending device of the present invention also comprises concentrically mounted shaft means for supporting the valve members for pivotal movement. In the exemplary embodiment, such shaft means comprises a pair of hollow axles 54, 55 connected to or integrally formed on brackets 56, 57, respectively, secured on the arcuate end walls 47, 48 of outer valve member 41. Each of the hollow axles are received in bushings 58, 59 mounted in housing bottom and top walls 23, 22, respectively, as seen best in FIG. 3. The shaft means of the present invention also includes an elongated axle or shaft 60 concentrically disposed within hollow axles 54, 55. Inner valve member 40 is provided with support brackets 61, 62 mounted on arcuate end walls 42, 43, each of the brackets having a set screw 63, 64 for fixedly mounting the inner valve member 40 with respect to elongated shaft 60 for pivotal movement therewith. Valve member 40 is therefore supported for movement into and out of the outer valve member 41.

As seen best in FIGS. 1 and 4 through 6, each of the valve members 40, 41 may be provided with sealing lips along the longitudinal edge of the radial sidewall. Valve member 40 is provided with T-shaped sealing lip 66 and valve 41 is also provided with a sealing lip 67 on its radial sidewall 50. As seen in FIG. 1, the front wall 24 of the housing 21 of the mixing valve is provided with sealing flanges 68, 69 disposed on the peripheral side edges of the opening to the outlet conduit 32. The rear wall 25 also is provided with an I-shaped sealing flange 70 disposed intermediate of the opening to the inlet conduits 28, 29. It may therefore be seen from FIG. 1 that a sealing edge may be formed between the sealing lip 66 on inner valve member 40 with the sealing flange 69 on the housing 21 when the inner valve is positioned as shown in FIG. 1 and with the I-shaped sealing flange 70 when the inner valve member is rotated clockwise from the position illustrated in FIG. 1. Similarly, the sealing lip 67 on outer valve member 41 is shown in FIG. 1 in sealing engagement with the I-shaped sealing flange 70 and such sealing lip will also engage sealing flange 68 of housing 21 when the outer member is rotated clockwise from the position shown in FIG. 1. Each of the sealing lips and flanges may be formed of some resilient material, such as rubber or the like, and all of the edges of the air mixing valve may be provided with sealing material, such as felt or the like to prevent fluid leakage.

Figure 7:
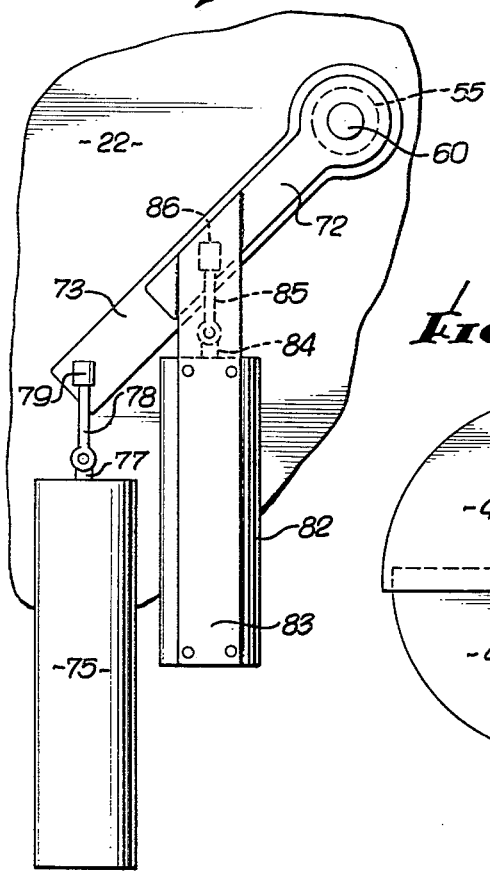
FIG. 7 is a fragmentary detailed top plan view of the control means of the device of FIG. 1.

The fluid mixing valve also comprises control means mounted exteriorly of the housing and engaging the shaft means for selectively positioning the valve members. The control means functions to select the proportion of fluid entering the mixing valve through each of the inlet conduits through positioning of the valve members and also controlling the volume of fluid discharge through the outlet conduit. In the exemplary embodiment, as seen in FIG. 7, the control means comprises a first lever 72 fixedly mounted on the elongated shaft 60 and a second lever 73 fixedly mounted on hollow axle 55. As seen in FIGS. 1 and 3, the control means is mounted exteriorly of the housing 21 of the mixing valve so as to facilitate service and maintenance of the control means without entry into the housing or requiring disassembly or dismantling of the fluid valve to accomplish the repair.

A temperature responsive motor 75 is fixedly mounted through a bracket 76 to the top wall 22 of the housing 21. Temperature responsive motor 75 includes an actuating rod 77 pivotally mounted to a link 78 which in turn is pivotally mounted through a universal joint 79 to second lever 73.

As second motor 82 responsive to the volumetric rate of fluid flow in the outlet conduit of the mixing valve is mounted on a bracket arm 83 fixedly supported to first lever 72 at an obtuse included angle. Second motor 82 includes an actuating rod 84 pivotally connected to a link 85 which in turn is connected to a universal joint 86 mounted on second lever 73.

Each of the motors 75, 82 may be electrical, hydraulic or air operated such as the air motors manufactured by Honeywell, Inc. of Minneapolis, Minn., and designated as Damper Operators MP909. The air motors for positioning the valve members in the mixing valve 20 are responsive to two conditions, namely, the temperature of the air space or room to which the air is supplied and the volumetric rate of air flow through the outlet conduit. The temperature responsive motor is therefore connected to conventional pneumatic thermostat means located in the air space or room to which the air is being delivered. Where an electric motor is used, of course, a conventional electrical thermostat means may be employed. The second motor 82 responsive to the volumetric rate of fluid flow in the outlet conduit is connected to a pneumatic differential pressure regulator such as that manufactured by Honeywell, Inc. of Minneapolis, Minn., and designated PP92. The differential pressure regulator will sense changes in total pressure within the duct or outlet conduit, thereby measuring the volumetric rate of flow, and through pneumatic connection will operate the second air motor 82.

Figure 6:
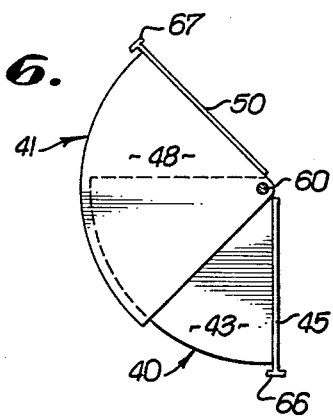
FIGS. 4 through 6 are top plan views of the valve members of the device of FIG. 1 in different positions.

Operation of the air mixing and volume controlling device or valve 20 may now be described. Assume that the valve 20 is initially in the condition shown in FIG. 1 as would occur when the temperature and volume conditions of the air space being supplied requires maximum volume of air flow and maximum temperature of such air. Under such conditions, the valve members 40 will be nested within valve member 41 as shown in FIG. 1 so that the hot air inlet conduit 30 is completely open and the outlet conduit 33 is opened to the maximum extent possible. Assume next that the conditions of the air space require that the volumetric rate of flow of air through the mixing valve is reduced by 50%. Under such conditions of operation, the temperature responsive motor 75 is inoperative but the second motor 82 is actuated to extend actuating rod 84 so as to move second lever 73 relative to first lever 72 thereby pivoting valve member 41 with respect to valve member 40 to assume the position as shown in FIG. 6. This phase of operation illustrates that changes in the volumetric rate of flow will effect a differential movement of one of the valve members with respect to the other valve member so as to increase or decrease the area through which the air may flow.

Figure 5:
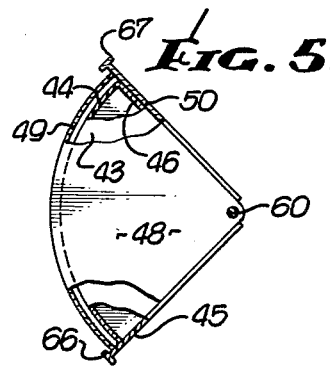

Assume next that the air space requires a reduction in temperature and a change in the volumetric rate of flow back to the maximum rate of flow as in the initial condition. Under such operating conditions, the thermostat means will cause simultaneous operation of motors 75 and 82 the result of which is to maintain lever 73 in the same position while the retraction of actuating rod 84 of motor 82 causes lever 72 to rotate in a clockwise direction, as viewed in FIG. 7, so as to position the valve members as seen in FIG. 5.

Assume that the next condition of the air space requires an increase in temperature but constant volumetric rate of flow. Under such conditions, the temperature responsive motor 75 will be actuated so that actuating rod 77 thereof will be withdrawn causing rotation of pivotal movement of outer valve member 41 but which also causes pivotal movement of valve member 40 since levers 73 and 72 are locked in relation to one another when the actuating rod of motor 82 is extended and the motor is not actuated. Thus, it will be seen that when a change in temperature alone is required for the air space to which the air is being supplied, the two valve members 40, 41 will move together, rather than relatively, so as to maintain a constant volume of air flow through the device while the proportion of air flow through the hot and cold air inlet conduits is being changed.

Figure 4:
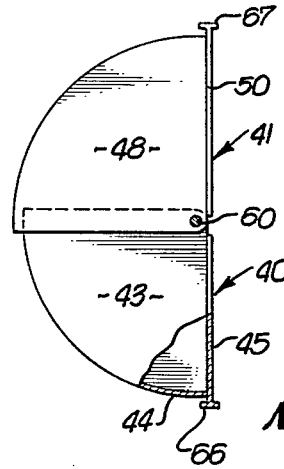

In the event that the air space being supplied would demand a complete cessation of air flow into such space, the motors would be operated so as to position the valve members 40 and 41 as shown in FIG. 4 where the outlet conduit is entirely closed.

It will of course be apparent to those skilled in the art that the valve members 40 and 41 through the control means may assume an infinite number of positions with respect to one another and will be moved relative to one another so as to control the volumetric rate of flow through the device, or together so as to vary the proportion of air admitted through the inlet conduits thereby changing the temperature of the air discharged from the device. It will also be appreciated that the air motors are connected to the levers for operating the valve members so that the entire pneumatic control system may be operated without any bleed passages.

As previously mentioned, the fluid mixing valve of the present invention may be used as an air mixing and volume controlling device in a building air distribution system. In such event, the device is constructed primarily of ordinary sheet metal formed by conventional methods so as to construct the housing and the valve members. Details of such sheet metal construction have not been included herein, nor have details with respect to sealing devices been disclosed, since these aspects of the device are well-known. Obviously, many modifications and variations of the present invention are possible in light of the above teaching. For example, but not by way of limitation, the fluid mixing valve may be used with various types of fluids, such as liquids, when constructed of other materials and with slight changes in constructional detail. It is therefore to be understood that within the scope of the appended claims the invention may be practiced otherwise than as specifically described.

I claim:

1. In a fluid mixing valve apparatus having a chambered housing with a plurality of inlets thereto and at least one outlet therefrom for mixing fluids introduced into said housing through said inlets and discharging said mixed fluids through said outlet, the improvement comprising the provision of:

fluid flow control means in said housing for controlling fluid flow from said inlets to said outlets including at least two relatively movable nested valve members, each having an arcuate front wall; and means for mounting said nested members within said housing with said arcuate front walls opposing said inlets and for moving each of said members relative to said housing and each other to vary the flow of fluid from said inlets to said outlets through said housing.

2. The improvement in fluid mixing valve apparatus of claim 1 wherein:

said plurality of inlets include at least two generally parallel inlet conduits at a first end of said housing and said outlet includes an outlet conduit at an opposite end of said housing, said fluid flow control means is disposed within said arcuate front walls facing toward said inlet conduits, and said nested valve members are movable into a fully expanded position of adjustment completely closing said outlet off from said inlets and a fully nested position wherein either or a combination of inlet fluid flow is allowed to pass to said outlet.

3. The improvement in fluid mixing valve apparatus of claim 1 wherein said inlets are supplied with fluid at different temperatures and wherein:

temperature and volumetric rate of flow sensing means are associated with said housing to sense the temperature and volumetric rate of fluid flow from said outlet;

first and second motor means are provided in association with said means for mounting said nested valve members, each of said motor means being adapted to move one of said members within said housing; and means are provided for operating one of said motor means to move one of said members relative to the other in response to the sensing of temperatures by said temperature sensing means and for operating both of said motor means to move both of said nested valve members in unison in response to sensing of volumetric rate of fluid flow by said volumetric rate of flow sensing means.

4. A fluid mixing valve comprising:

a chambered housing having a pair of inlet conduits and at least one outlet conduit;

a pair of hollow valve members, one of said members comprising opposed arcuate sector end walls, a pair of radial side walls and an arcuate front wall so as to define a hollow enclosure, the other of said members being larger than said one member and comprising arcuate sector end walls, one radial side wall and an arcuate front wall; and concentrically mounted shaft means, each supporting one of said valve members for pivotal movement relative to said housing and relative to one another whereby said smaller valve member is movable into and out of said larger valve member to vary the volume of fluid flow through said housing and said members are movable together relative to said housing inlets to vary the proportioning of fluid flow from said inlets.

5. The fluid mixing valve of claim 4 including:

means mounted exteriorly of said housing operably engaging each of said shaft means for pivoting said valve members so as to selectively control the proportion of fluid entering said housing chamber through each inlet conduit and the volume of fluid discharged through said outlet conduit.

6. The fluid mixing valve of claim 5 wherein one of said shaft means comprises a pair of hollow axles mounted on said larger valve member arcuate sector end walls and pivotally received in said housing, and the other of said shaft means comprising an elongated shaft concentrically and pivotally disposed within said hollow axles and supporting said smaller valve member.

7. The fluid mixing valve of claim 6 wherein said means operably engaging each of said shaft means for rotating said valve members comprises:

a first lever fixedly mounted on said elongated shaft;

a second lever fixedly mounted on one of said hollow axles;

a temperature responsive motor mounted on said housing and connected to said second lever; and a second motor responsive to the volumetric rate of fluid flow in said outlet conduit, fixedly mounted on said first lever and connected to said second lever, whereby movement of said second lever by said temperature responsive motor in response to changes in temperature effects movement of said first lever so as to pivot said valve members together, and movement of said first lever through actuation of said volumetric rate of flow responsive motor in response to changes in volumetric fluid flow within said outlet conduit effects relative movement of said valve members so as to vary the fluid flow area.

8. In an air mixing and volume controlling device including a housing having one hot and one cold air inlet conduit and at least one air outlet conduit in common communication with each other, an air volumetric rate of flow sensing means associated with said outlet conduit, and thermostat means associated with a space supplied with air from said device, the provision of:

a pair of hollow drum-type valve members pivotally and coaxially mounted in said housing, one of said valve members being receivable within the other of said members;

concentrically mounted shaft means, each supporting one of said drum-type valve members for pivotal movement; and means mounted exteriorly of said housing operably engaging each of said shaft means for rotating said valve members together or relative to one another so as to selectively control the proportion of air entering said device through each inlet conduit in response to said thermostat means and controlling the volume of air discharged through said outlet conduit in response to said air volumertic rate of flow sensing means.

9. The provision of claim 8 wherein one of said hollow drum-type valve members comprises a sheet-metal enclosure including arcuate sector end walls, side walls and a curved front wall, and the other of said holow drum-type valve mebers comprises a sheet-metal enclosure including arcuate sector end walls and a curved front wall and one side wall, said front and side walls of said other valve member being larger than the front and side walls of said one valve member so that said one valve member is receivable within said other valve member.

10. The provision of claim 8 wherein one of said shaft means supports the smaller of said valve members and the other of said shaft means supports the larger of said valve members and said means for rotating said valve members comprises:

a first lever mounted on said shaft means supporting the smaller of said valve members;

a second lever mounted on said shaft means supporting the larger of said valve members;

a temperature responsive fluid motor mounted on said housing and connected to said second lever; and a volumetric rate of air flow responsive fluid motor mounted on said first lever and connected to said second lever, whereby operation of said temperature responsive fluid motor effects rotation of said valve members together and operation of said volumetric rate of air flow responsive fluid motor effects relative rotation of said valve members.

11. The provision of claim 8 wherein each of said valve members have a substantially 90° arcuate sector cross section.

References Cited
UNITED STATES PATENTS

| | | | |
|---|---|---|---|
| 2,236,249 | 3/1941 | Newton | 236—80 X |
| 2,286,749 | 6/1942 | McElgin | 236—13 X |

EDWARD J. MICHAEL, Primary Examiner